United States Patent

[11] 3,565,223

[72] Inventor William C. Pierce
  Dallas, Tex.
[21] Appl. No. 831,429
[22] Filed June 9, 1969
[45] Patented Feb. 23, 1971
[73] Assignee Pitts Industries, Inc.
  Dallas, Tex.

[54] RESILIENT LINING FOR MAGNETIC CLUTCH
  3 Claims, 3 Drawing Figs.
[52] U.S. Cl. .................................................. 192/84,
   192/106.1, 192/107
[51] Int. Cl. ...................................................... F16d 27/07
[50] Field of Search ............................................... 192/70.14,
  70.17, 70.18, 84 (C), 84 (A1), 84 (A2), 84 (B),
  52, 106.1, 107, 107 (CP)

[56] References Cited
  UNITED STATES PATENTS
  1,927,995  9/1933  Stanley ........................ 192/70.14(X)

2,400,625  5/1946  Bloomfield .................. 192/84(A)(X)
2,919,777  1/1960  Walter ......................... 192/84(C)
3,205,989  9/1965  Mantey ........................ 192/52(X)
3,455,421  7/1969  Miller ......................... 192/84(C)

Primary Examiner—Allan D. Herrmann
Attorney—Herbert J. Brown

ABSTRACT: A magnetic clutch including a driven rotor having a drive pulley therearound and an armature assembly including a spring-mounted armature disc positioned to frictionally engage a face of the rotor. The primary feature of the invention is a resilient lining in and slightly projecting from the face of the armature disc and located around the pole faces. In operation the rotor face and the armature face are in metal-to-metal contact but the resilient lining prevents or reduces noise on impact. In a preferred form of the invention the armature assembly includes a circular resilient cushion on which a spring supporting plate and the armature disc are mounted.

PATENTED FEB 23 1971 3,565,223

INVENTOR.
WILLIAM C. PIERCE
BY
Herbert J. Brown
attorney

RESILIENT LINING FOR MAGNETIC CLUTCH

This invention relates to magnetic clutches such as those used in automobile air conditioners and has reference to a noise damping mechanism therefor.

An object of the invention is to provide a resilient circular lining in a face of a magnetic clutch for initially engaging a mating face and thereby reducing or eliminating contact noise.

Another object is to locate the referred-to resilient lining outwardly of the pole faces so as to provide parallel movement of the armature and thereby reduce wear on the metal friction surfaces.

Another object of the invention, in addition to the foregoing, is to provide a circular cushion on an armature hub for resiliently supporting an armature disc for assuring maximum contact between the referred-to mating faces of the clutch.

These and other objects will become apparent from the following description and the accompanying drawing, in which.

Figure 1:
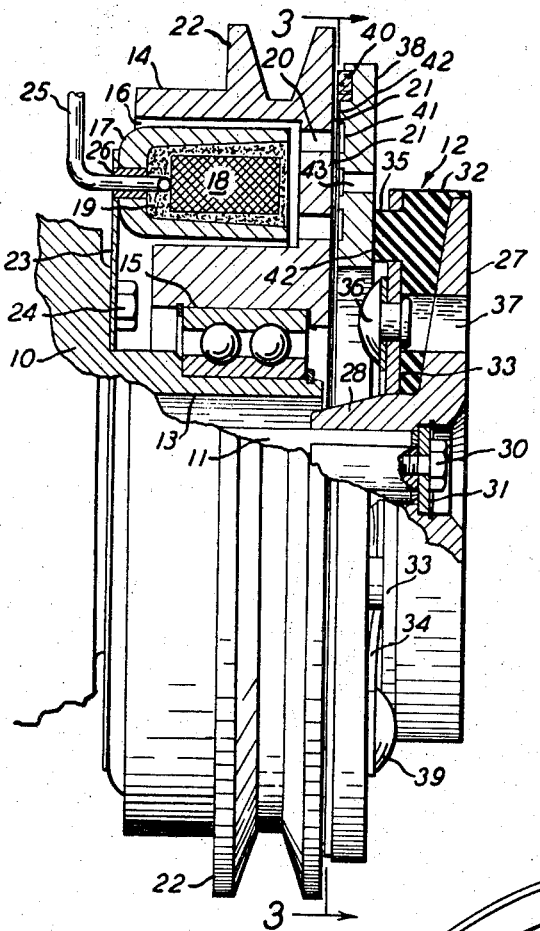
FIG. 1 is a side elevational and broken sectional view of a magnetic clutch according to the invention.
Figure 2:
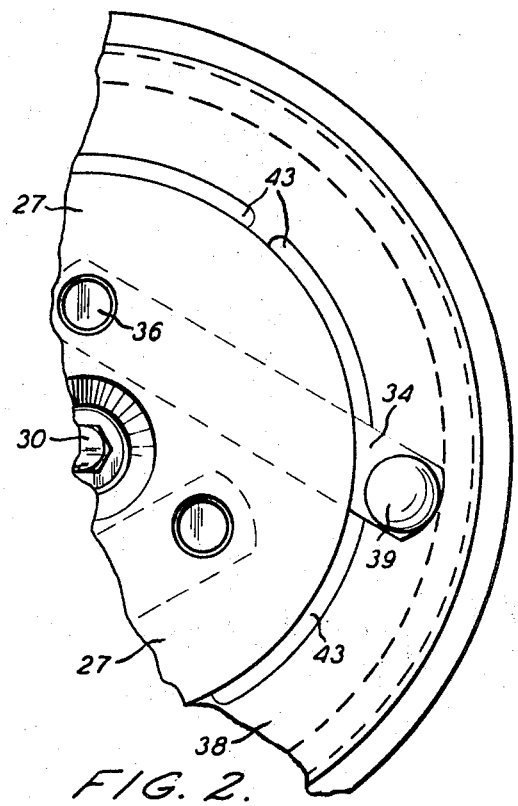
FIG. 2 is a broken end elevation of the clutch shown in FIG. 1.
Figure 3:
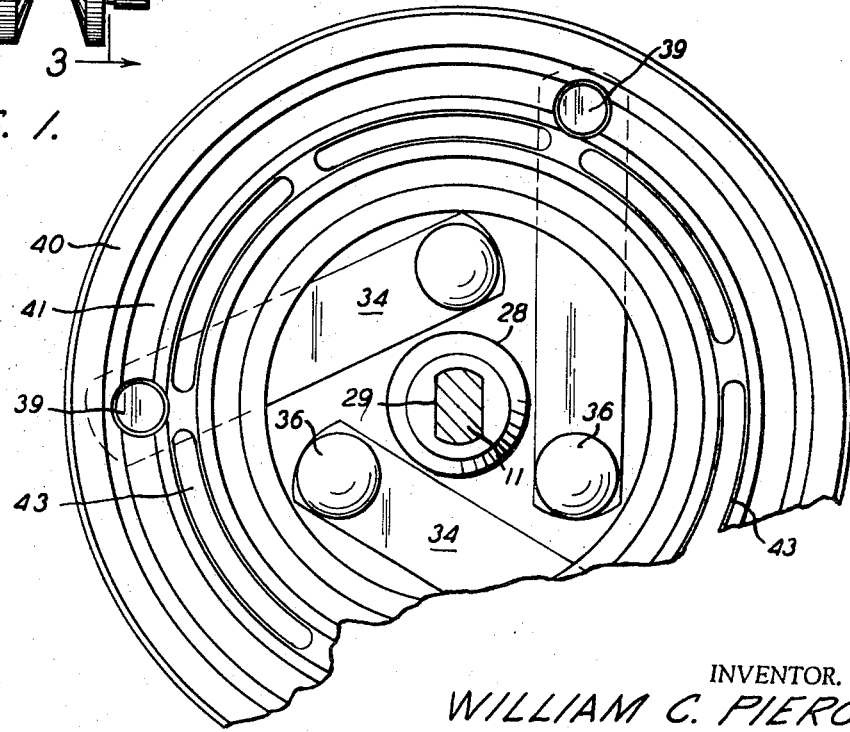
FIG. 3 is a broken elevational view taken approximately on line 3—3 of FIG. 1.

In the drawing the numeral 10 generally indicates the end of a compressor having an extending shaft 11 on which an armature assembly 12 is mounted in the manner hereinafter referred to.

An integral shouldered collar 13 projects from the compressor 10 for rotatably supporting a rotor 14 which is mounted thereon by means of a roller bearing 15. The side of the rotor 14 adjacent the compressor 10 has a large annular recess 16 for receiving a stationary coil shell 17 which has a circular electric magnetic coil 18 therein embedded in potting compound 19. The side of the shell 17 facing the end of the recess 16 is open for receiving the coil 18 and the compound 19, and the shell is spaced from the recess in the rotor on all three sides. The end of the recess 16 opposite the open side of the shell 17 has spaced arcuate slots 20 about the axis of the shaft 11 and thereby provides multiple pole faces 21 on the friction or outer face of the rotor 14. A V-belt pulley 22 is integral with the circumference of the rotor 14 and has to do with driving the compressor 10 as will become apparent. The coil shell 17 is rigidly mounted on a sheet metal ring 23 which is demountably secured to the end of the compressor 10 by bolts 24. An electrical lead 25 extends through the mounting plate 23 and an insulator 26 in the shell 17 to energize the coil 18.

The armature assembly 12 includes a hub 27 having an inwardly directed tapered neck 28 which fits the compressor shaft 11. Flat areas 29 on opposite sides of the shaft 11 and in the neck 28 secure these parts against relative rotation. The hub 27 is detachably secured on the shaft by a bolt 30 and washers 31 beneath the bolt head. The inner surface of the hub 27 is tapered where it receives a circular cushion 32 of resilient material which is vulcanized in place. The surface of the cushion 32 toward the rotor 14 is planar and has a circular spring mounting plate 33 vulcanized thereon for supporting diagonally disposed leaf springs 34. As shown in FIG. 1, the spring mounting plate 33 has openings (not numbered) for receiving resilient buttons or bumpers 35 which extend through the plate. Only one bumper 35 is shown but it is to be understood that there are a multiple of such bumpers, not less than three.

The inner ends of the springs 34 are attached to the mounting plate 33 by rivets 36, the heads of which bear against the spring surfaces. Holes 37 are provided in the hub 27 and cushion 32 for bucking the rivet ends.

An armature disc 38 in the shape of a wide flat ring is located opposite the rotor pole faces 21 and is attached to the extending ends of the springs 34 by other rivets 39. The face of the armature disc 38 is grooved near its periphery where it receives a circular resilient lining 40 which may be of any suitable material but impregnated cork is preferred. The exposed surface of the lining 40 projects beyond the face of the armature disc 38, preferably a distance of approximately .002 inches to .005 inches. In the face of the armature disc 38, and in offset relation to the pole faces 21 of the rotor 14, there are circular grooves 41 which provide friction contact pole faces 42 between the grooves and outwardly of the grooves. As shown, one of the inner grooves has connected slots 43 therethrough so as to provide a tortuous flux path and thereby increase the braking torque.

When the coil 18 is energized the armature disc 38 is drawn to and makes contact with the face of the driven rotor 14. Initial contact of the lining 40 with the rotor face reduces or eliminates contact noise, after which the rotor and armature faces are in frictional contact which, through the armature assembly, rotates the compressor shaft 11. When the coil 18 is deenergized the springs 34 separate the rotor and armature faces, at which time the armature disc 38 contacts the resilient bumpers 35 for reducing or eliminating noise during this phase of the operation.

I claim:

1. A magnetic clutch for driving a shaft, a driven rotor independent of said shaft and positioned therearound, said rotor having a friction face perpendicular to the axis of the shaft, a stationary electromagnet received in said rotor and directed toward the friction face thereof and thereby providing at least one pole face, an armature assembly comprised of a hub on said shaft, means securing hub and said shaft against relative rotation, an armature disc having a face opposite the face of said rotor, spring means normally spacing the face of said armature disc from the face of said rotor, at least one groove in the face of said armature disc defining pole faces on the sides of the groove and a ring-shaped resilient lining carried by said armature disc and projecting from the face thereof, said resilient lining being around and outwardly of said pole faces, the projecting distance of said lining being such that the faces of the rotor and the armature disc are in contact after the liner initially contacts the rotor face.

2. A magnetic clutch as defined in claim 1 and including a resilient cushion between said hub and said spring means.

3. A magnetic clutch for driving a shaft, a driven rotor independent of said shaft and positioned therearound, said rotor having a friction face perpendicular to the axis of the shaft, a stationary electromagnet received in said rotor and directed toward the friction face thereof and thereby providing at least one pole face, an armature assembly comprised of a hub on said shaft, means securing hub and said shaft against relative rotation, an armature disc having a face opposite the face of said rotor, spring means normally spacing the face of said armature disc from the face of said rotor, at least one groove in the face of said armature disc defining pole faces on the sides of the groove, a ring-shaped resilient lining carried by said armature disc and projecting from the face thereof, the projecting distance of said lining being such that the faces of the rotor and the armature disc are in contact after the liner initially contacts the rotor face and said clutch including resilient bumpers carried by said hub and positioned to be contacted by said armature disc when the latter is released by said electromagnet.